(12) United States Patent
Siewert et al.

(10) Patent No.: US 8,469,393 B1
(45) Date of Patent: Jun. 25, 2013

(54) FOAM-IN-PLACE INTERIOR PANELS HAVING INTEGRATED AIRBAG DOOR FOR MOTOR VEHICLES AND METHODS FOR MAKING THE SAME

(75) Inventors: William Siewert, Marine City, MI (US); Adrien Bender, Clawson, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/562,799

(22) Filed: Jul. 31, 2012

(51) Int. Cl.
*B60R 21/20* (2006.01)

(52) U.S. Cl.
USPC ...................................... 280/728.3

(58) Field of Classification Search
USPC ...................................... 280/728.3
See application file for complete search history.

(56) References Cited

U.S. PATENT DOCUMENTS

| | | | |
|---|---|---|---|
| 5,845,931 A | 12/1998 | Nagy et al. | |
| 6,250,669 B1 * | 6/2001 | Ohmiya | 280/732 |
| 6,457,739 B1 * | 10/2002 | Dailey et al. | 280/728.3 |
| 6,623,029 B2 | 9/2003 | Sun et al. | |
| 6,735,878 B2 | 5/2004 | Lie | |
| 7,237,797 B2 | 7/2007 | Dailey et al. | |
| 7,914,039 B2 | 3/2011 | Mazzocchi et al. | |
| 8,336,906 B2 * | 12/2012 | Kim et al. | 280/728.3 |
| 2006/0214399 A1 | 9/2006 | Okamoto et al. | |

FOREIGN PATENT DOCUMENTS

| | | |
|---|---|---|
| DE | 19948021 A1 | 4/2001 |
| JP | 2008149810 A | 7/2008 |

* cited by examiner

*Primary Examiner* — Faye M. Fleming
(74) *Attorney, Agent, or Firm* — Ingrassia Fisher & Lorenz, PC

(57) ABSTRACT

Interior panels having integrated airbag doors for motor vehicles and methods for making such interior panels are provided herein. In one example, an interior panel comprises a substrate having outer and inner surfaces and an opening extending therethrough. An airbag chute-door assembly is mounted to the substrate and comprises a chute wall that at least partially surrounds an interior space. A door flap portion is pivotally connected to the chute wall and at least partially covers the opening. A perimeter flange extends from the chute wall and has a flange section that overlies the outer surface of the substrate. A molded-in lip feature extends from the flange section and contacts the outer surface to form a seal between the flange section and the substrate. A skin covering extends over the substrate and a foam is disposed between the skin covering and the substrate.

14 Claims, 4 Drawing Sheets

FOAM-IN-PLACE INTERIOR PANELS HAVING INTEGRATED AIRBAG DOOR FOR MOTOR VEHICLES AND METHODS FOR MAKING THE SAME

TECHNICAL FIELD

The technical field relates generally to interior panels structured for inflatable restraints for motor vehicles, and more particularly to foam-in-place interior panels having integrated airbag doors for motor vehicles and methods for making such interior panels.

BACKGROUND

Motor vehicles often include an inflatable restraint apparatus having an airbag device with a deployable airbag positioned in or behind an interior vehicle panel, such as an instrument panel, door panel, seats, and the like. Many interior panels include an integrated airbag door formed into the interior panel that is designed to break free upon deployment of the airbag. Often an area of the interior panel surrounding the integrated airbag door is scored or pre-weakened to form a seam that facilitates a clean airbag deployment e.g., airbag deployment with minimal or no fragmentation.

Foam-in-place (HP) interior panels are often used to provide a padded finish to desired areas of the interiors of motor vehicles. FIP interior panels include a substrate and a skin covering with a foam layer formed between the skin covering and the substrate to provide padding for a softer finish. During fabrication, the foam layer is typically formed by injecting a liquid, e.g., polyurethane precursors such as diisocynates and polyols, or other foam forming material(s), between the substrate and the skin covering. In FIP interior panels that include an airbag device, an opening is typically defined in the substrate to accommodate the airbag device. During foaming, there is a possibility that the liquid foam forming material that is injected between the skin and the substrate may seep into the opening in the substrate that is for accommodating the airbag device. As a result, foam may be formed into areas that interface with the airbag device during airbag deployment, which would be undesirable. Consequently, there is a need to form a seal to prevent liquid foam forming material from entering the opening and leaking into areas that interface with the airbag device to minimize fragmentation during airbag deployment.

In one example disclosed in U.S. Pat. No. 7,237,797, issued to Dailey et al., a modular airbag door assembly that includes an airbag chute is mounted to a substrate of a FIP instrument panel. The modular airbag door assembly covers an opening formed through the substrate and an airbag device is attached to the airbag chute. The FIP instrument panel includes a manually applied gasket that is sandwiched between a flange of the airbag chute and the outer surface of the substrate surrounding the opening. The gasket provides a seal between the airbag chute and the outer surface of the substrate to prevent liquid foam forming material from leaking into areas that interface with the airbag device. Unfortunately, the manually applied gasket is not always properly positioned or is missing altogether, which results in leakage of the liquid foam forming material into and/or around the airbag device. Additionally, the piece cost of the gaskets and the expense of applying the gaskets can be relatively expensive.

Accordingly, it is desirable to provide FIP interior panels having integrated airbag doors for motor vehicles with consistent sealing to prevent liquid foam forming material from leaking into areas that interface with an airbag device, and methods for making such interior panels. Additionally, it is desirable to provide HP interior panels having integrated airbag doors for motor vehicles with relatively low cost sealing, and methods for making such interior panels. Furthermore, other desirable features and characteristics of the present invention will become apparent from the subsequent detailed description and the appended claims, taken in conjunction with the accompanying drawings and this background.

BRIEF SUMMARY

Interior panels having integrated airbag doors for motor vehicles and methods for making such interior panels are provided herein. In accordance with an exemplary embodiment, an interior panel having an integrated airbag door for a motor vehicle includes, but is not limited to, a substrate having an outer surface, an inner surface, and an opening extending therethrough. An airbag chute-door assembly is mounted to the substrate. The airbag chute-door assembly comprises a chute wall at least partially, surrounding an interior space. The chute wall is configured to direct passage of an airbag through the interior space towards the opening during deployment. A door flap portion is pivotally connected to the chute wall and at least partially covers the opening. A perimeter flange extends from the chute wall away from the interior space. The perimeter flange has a flange section that overlies the outer surface of the substrate and a molded-in lip feature that extends from the flange section and contacts the outer surface to form a seal between the flange section and the substrate. A skin covering extends over the substrate and a foam is disposed between the skin covering and the substrate.

In accordance with another exemplary embodiment, a method of making an interior panel having an integrated airbag door for a motor vehicle is provided. The method comprises the steps of mounting an airbag chute-door assembly to a substrate such that the airbag chute-door assembly at least partially covers an opening in the substrate. A molded-in lip feature extends from a flange section of a perimeter flange of the airbag chute-door assembly to contact an outer surface of the substrate to form a seal between the airbag chute-door assembly and the substrate. A skin covering is positioned extending over the outer surface of the substrate. A liquid foam forming material is dispensed between the skin covering and the substrate. The liquid foam forming material is allowed to form a foam.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
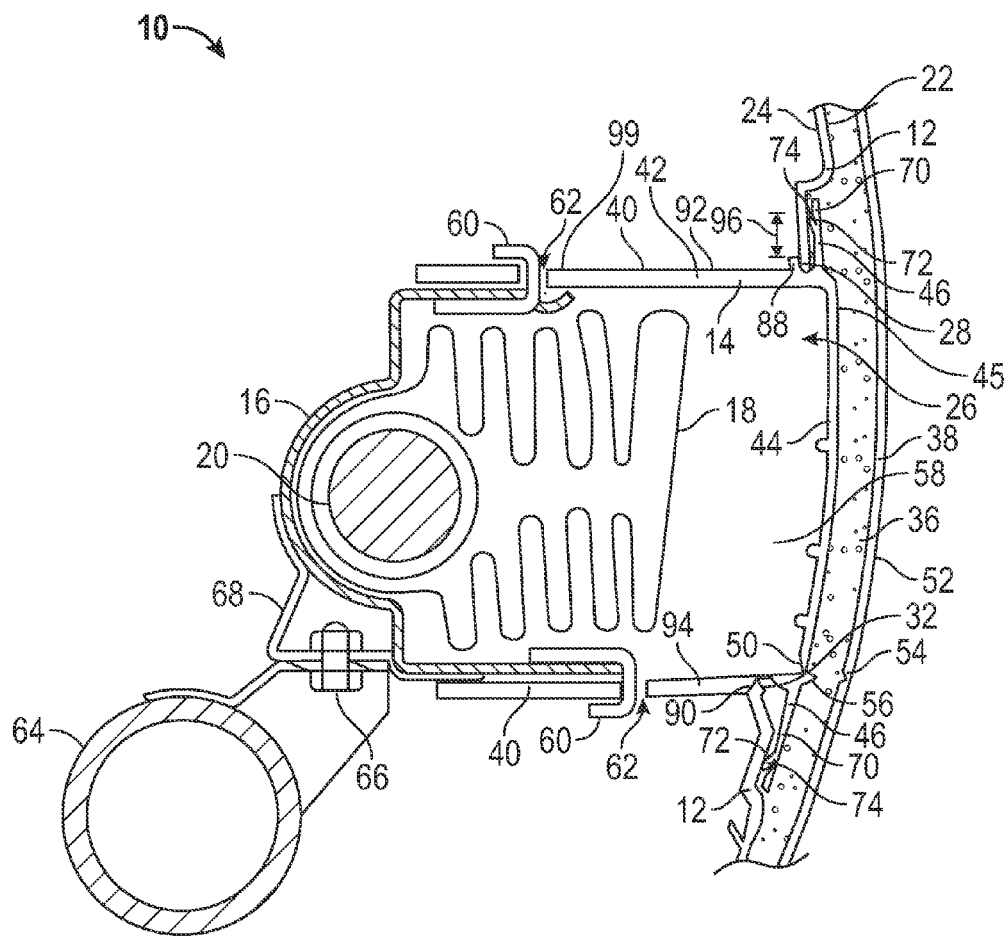
FIG. 1 is a vertical sectional view of a HP interior panel for a motor vehicle including a substrate and an airbag chute-door assembly in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to HP interior panels having integrated airbag doors for motor vehicles, and methods for making such interior panels. The exemplary embodiments taught herein provide an interior panel for a motor vehicle comprising a substrate and an airbag chute-door assembly. The substrate has an outer surface, an inner surface, and an opening extending through the substrate.

During an early fabrication stage, in accordance with an exemplary embodiment, the airbag chute-door assembly is mounted to the substrate and at least partially covers the opening. In an exemplary embodiment, the airbag chute-door assembly comprises a chute wall that extends through the opening and at least partially surrounds an interior space that is adjacent to the opening and the inner surface of the substrate. The chute wall is configured to receive an airbag module that contains an airbag and to direct passage of the airbag through the interior space towards the opening during deployment. The airbag chute-door assembly further includes a door flap portion that pivotally connects to the chute wall and at least partially covers the opening. A perimeter flange extends from the chute wall away from the interior space. The perimeter flange has a flange section that overlies the outer surface of the substrate and a molded-in lip feature that extends from the flange section and contacts the outer surface to form a seal between the flange section and the substrate. The term "molded-in lip feature" as used herein refers to a lip feature or cantilevered-type feature that is integrally formed with the perimeter flange (e.g., integrally formed with the entire airbag chute-door assembly including the perimeter flange) during a molding process to form a monolithic structure. In an exemplary embodiment, the molded-in lip feature is laterally adjacent to and surrounds the opening to form the seal around the entire opening.

At a later fabrication stage, in accordance with an exemplary embodiment, the substrate with the mounted airbag chute-door assembly is positioned relative to a skin covering, e.g., in a reaction injection molding (RIM) foaming tool, such that the skin covering extends over the outer surface of the substrate. The fabrication process continues by dispensing a liquid foam forming material (e.g., liquid reactants used to form polyurethane foam, polyurea foam, or the like as are well known in the art) between the skin covering and the substrate and allowing the liquid foam forming material to react and/or solidify to form a foam. In particular, the seal between the flange section and the substrate acts as a flow stop or shut off to prevent or obstruct the flow of the liquid foam forming material past the molded-in lip feature and into the opening of the substrate which would otherwise result in leakage of the liquid foam forming material into the interior space where the airbag interfaces during deployment. Moreover, because the molded-in lip feature is integrally formed with the perimeter flange/airbag chute-door assembly, the seal is consistently positioned to provide sealing to prevent liquid foam forming material leakage. Additionally, there is no separate piece cost for the molded-in lip feature or any expense of manually applying a separate seal or gasket.

Figure 2:
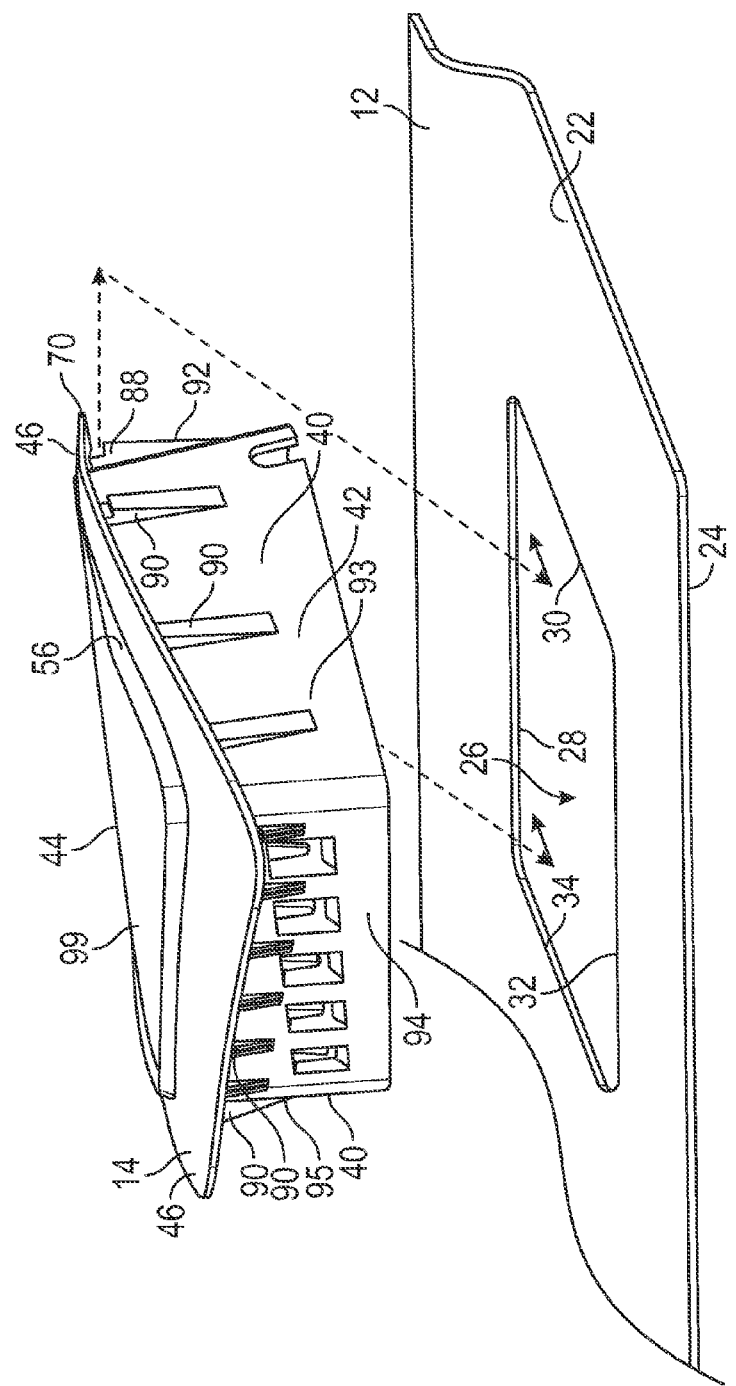
FIG. 2 is a partial exploded perspective view of a substrate and an airbag chute-door assembly in accordance with an exemplary embodiment.

FIG. 1 is a vertical sectional view of an interior panel 10 including a substrate 12 and an airbag chute-door assembly 14 for a motor vehicle in accordance with an exemplary embodiment. FIG. 2 is a partial exploded perspective view of the substrate 12 and the airbag chute-door assembly 14 depicted in FIG. 1. In an exemplary embodiment, the interior panel 10 is an instrument panel that can be positioned forward of a driver seat and a front passenger seat in an interior of the motor vehicle. As such, FIG. 1 depicts a view of the interior panel 10 forward of the front passenger seat. Alternatively, the interior panel 10 can be a door panel or other interior vehicle trim panel. As illustrated, the interior panel 10 comprises the substrate 12, the airbag chute-door assembly 14, and an airbag module 16 that contains a deployable airbag 18 and an inflator 20.

The substrate 12 has an outer surface 22 that faces towards the interior of the motor vehicle, an inner surface 24 that faces away from the interior of the motor vehicle, and an opening 26 that is formed through the substrate 12. As illustrated, the opening 26 is defined by inner perimeter edges 28, 30, 32, and 34 of the substrate 12 and is covered by the airbag chute-door assembly 14, which is mounted to the substrate 12 as will be described in further detail below. The substrate 12 may be formed of a plastic material, such as, for example, styrene maleic anhydride (SMA), polycarbonate (PC), ABS, PC/ABS, polypropylene (PP), or any other substrate material for vehicle interior applications known to those skilled in the art. The outer surface 22 of the substrate 12 and the airbag chute-door assembly 14 are covered by foam 36 and a skin covering 38 to define the interior panel 10 as an HP interior panel.

The airbag chute-door assembly 14 comprises a chute wall 40 that defines a chute portion 42, a door flap portion 44 that is pivotally connected to the chute portion 42 via a hinge 45, and a perimeter flange 46 that surrounds the chute portion 42. In an exemplary embodiment, the airbag chute-door assembly 14 is pre-weakened to define a seam 50 to form a "U-pattern" door arrangement with the single door flap portion 44. Alternative door arrangements known to those skilled in the art may also be used, such as, for example, an "H-pattern" door arrangement formed using multiple door flap portions. The door flap portion 44 and the overlying foam 36 and skin covering 38 together define an integrated airbag door 52 that opens in a parting manner along the seam 50 to permit the airbag 18 to unfold and inflate outside of the interior panel 10. To facilitate the opening of the integrated airbag door 52, the skin covering may be pre-weakened to define a seam 54 that tears during airbag deployment. Additionally, the airbag chute-door assembly 14 may include a ridge 56 that directs tearing of the foam 36 between the seams 50 and 54 during airbag deployment.

The chute wall 40 at least partially surrounds an interior space 58. The interior space 58 is sized to permit passage of the airbag 18 towards the door flap portion 44 and the integrated airbag door 52 during airbag deployment. Attached to the chute wall 40 is the airbag module 16 that accommodates the airbag 18 in the folded state. As shown, the airbag module 16 has a plurality of hooks 60 that project outwardly through chute wall openings 62 to engage the chute wall 40. The airbag module 16 is attached to a cross member 64 by a bolt and nut 66 via a supporting member 68.

Figure 3:
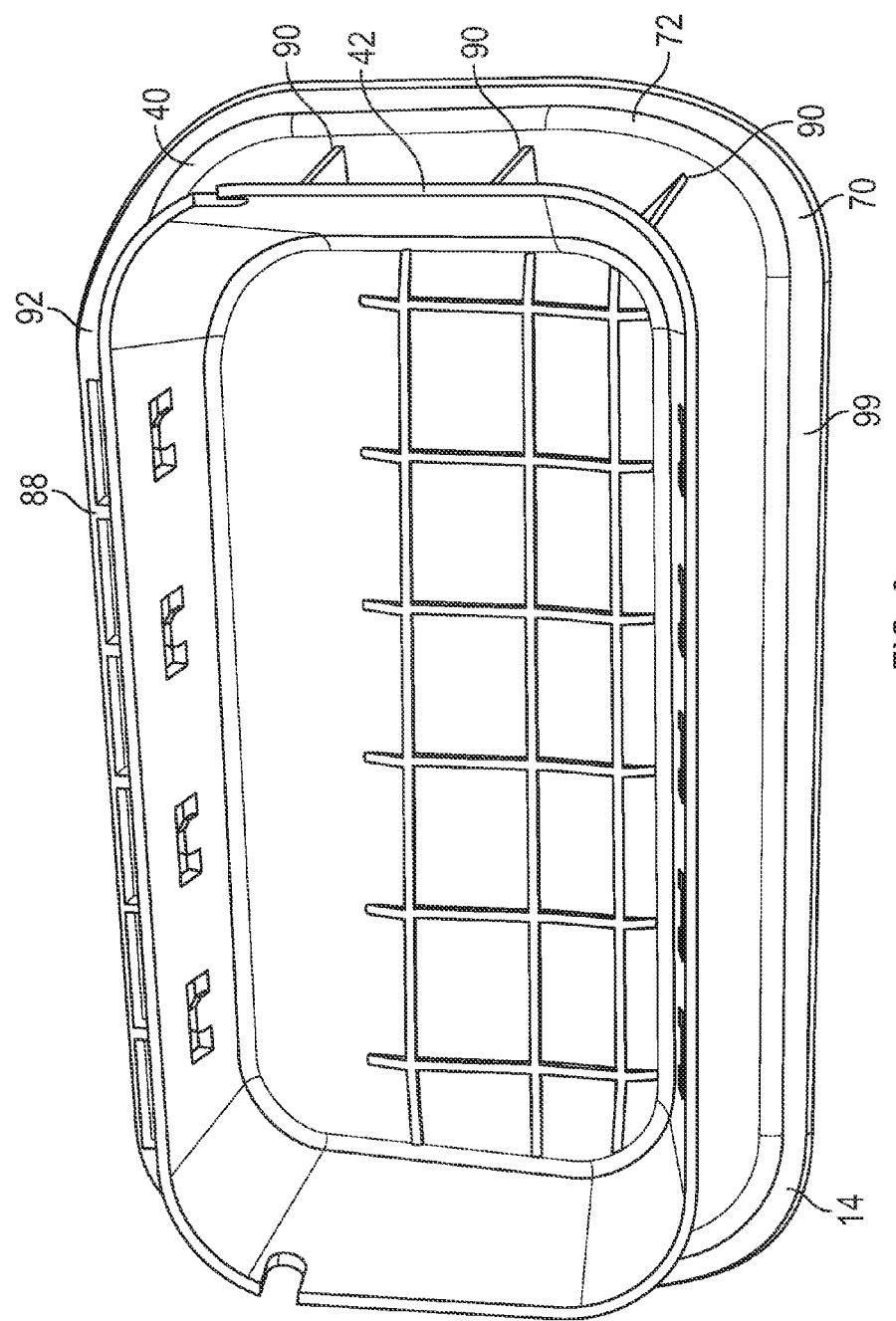
FIG. 3 is a perspective rear view of an airbag chute-door assembly in accordance with an exemplary embodiment.

The perimeter flange 46 extends from the chute wall 40 away from the interior space 58 and has a flange section 70 and a molded-in lip feature 72. The flange section 70 overlies the outer surface 22 of the substrate 12. The molded-in lip feature 72 extends from the flange section 70 and pressingly contacts the outer surface 22 to form a seal 74 between the flange section 70 and the substrate 12. Referring also to FIG. 3, in an exemplary embodiment, both the flange section 70 and the molded-in lip feature 72 surround the chute portion 42, which is disposed through the opening 26. As such, the molded-in lip feature 72 surrounds the opening 26 and forms the seal 74 completely around the opening 26. During an early fabrication stage for forming the foam 36, this arrangement advantageously allows the seal 74 to prevent leakage of a liquid foam forming material into the interior space 58.

Figure 4:
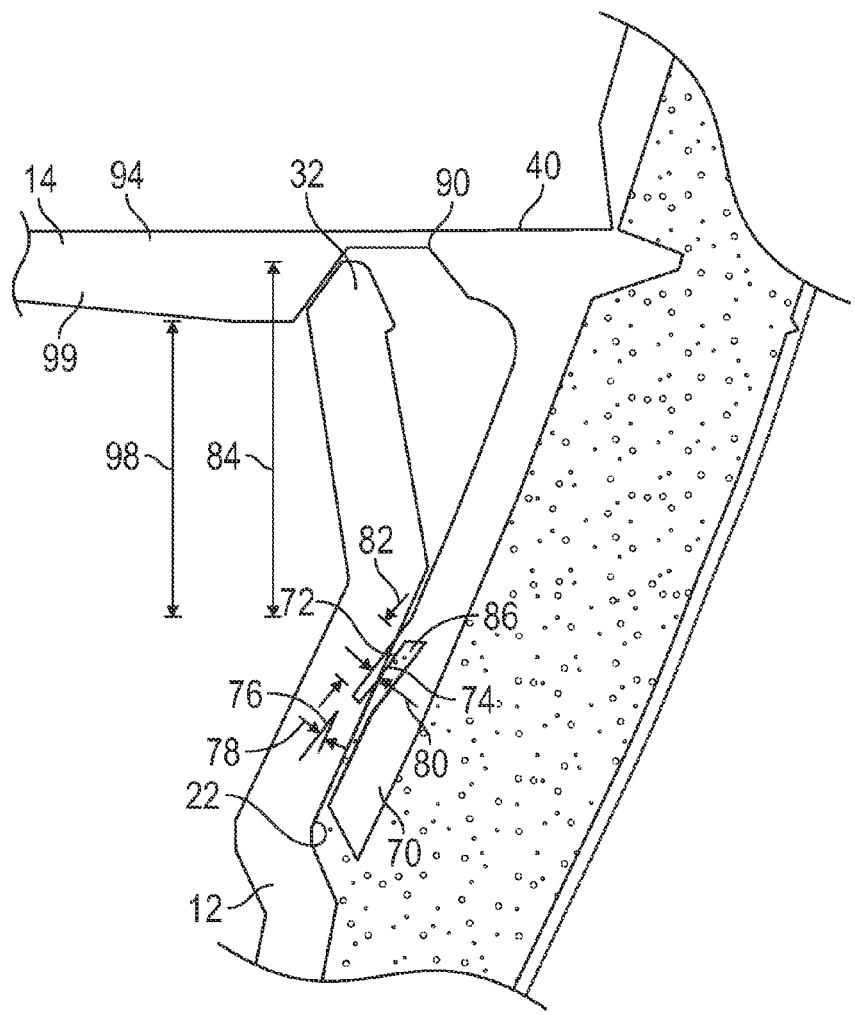
FIG. 4 is an enlarged partial view of the FIP interior panel depicted in FIG. 1.

Referring to FIGS. 1 and 4, in an exemplary embodiment, the molded-in lip feature 72 in its nominal design position as illustrated in FIG. 4 interferes with the outer surface 22 of the substrate. As such, the molded-in lip feature 72 flexes, bends, and/or compresses to conform to the outer surface 22 to form the seal 74. In one embodiment, the molded-in lip feature 72 extends from the flange section 70 in a direction (indicated by arrow 76) away from the opening 26. This advantageously allows the molded-in lip feature 72 to be a relatively stiff in one direction to resist the flow of a liquid foam forming material while being relatively compliant in another direction to compress and/or bend against the outer surface 22 to form the seal 74. In one example, the molded-in lip feature 72 extends from the flange section 70 at an angle (indicated by arrows 78) of from about 1 to about 44 degrees, such as from about 1 to about 17 degrees, for example from about 7 to about 10 degrees. By having the angle less than 45 degrees, the molded-in lip feature 72 can be formed with less complicated tooling using a slide(s) or a lifter during molding/fabrication. In an exemplary embodiment, the molded-in lip feature 72 has a thickness (indicated by arrows 78) of from about 0.5 to about 3 mm, such as from about 1 to about 2 mm, for example from about 1 to about 1.5 mm. In an exemplary embodiment, the molded-in lip feature 72 extends from the flange section 70 a length (indicated by arrows 82) of from about 2 to about 6 mm. By defining the molded-in lip feature 72 with the thickness and length as discussed above, this advantageously allows the molded-in lip feature to be relatively flexible to compress and/or bend against the outer surface 22 of the substrate 12 to form the seal 74. In yet another exemplary embodiment, the molded-in lip feature 72 is laterally offset from the inner perimeter edge(s) 28, 30, 32, and/or 34 a distance (indicated by double headed arrow 84 of from about 0.5 to about 5 mm. By positioning the molded-in lip feature 72 relatively close to the inner perimeter edge(s) 28, 30, 32, and/or 34, sealing around the opening 26 is easier to maintain during the foam fabrication stage(s). In another exemplary embodiment, the flange section 70 defines a relief channel 86 that is disposed adjacent to the molded-in lip feature 72. The relief channel 86 advantageously allows the molded-in lip feature 72 space to move in from its nominal design position to its assembled mounted position to effectively form the seal 74.

Referring to FIGS. 1-4, in an exemplary embodiment, the airbag chute-door assembly 14 defines a grooved hinge 88 and a plurality of snap features 90. The grooved hinge is formed along a section 92 of the chute wall 40 and the snap features 90 are spaced apart and formed along sections 93, 94, and 95 of the chute wall 40. In an exemplary embodiment, during an early fabrication stage of the interior panel 10 prior to foaming, the airbag chute-door assembly 14 is mounted to the substrate 12 by first engaging the inner perimeter edge 28 in the grooved hinge 88 and rotating the sections 93, 94, and 95 of the chute wall 40 about the grooved hinge 88 and through the opening 26 such that the snap features 90 engage the perimeter edges 30, 32, and 34. The grooved hinge 88 and the snap features 90 facilitate mounting of the airbag chute-door assembly 14 to the substrate 12 preferably without the use of threaded fasteners. In an exemplary embodiment, the snap features 90 are spaced apart from each other by a distance of from about 20 to about 60 mm. In one embodiment, the molded-in lip feature 72 is laterally offset from the grooved hinge 88 by a distance (indicated by double headed arrow 96) of from about 0.5 to about 8 mm, such as about 0.5 to about 5 mm, for example from about 0.5 to about 3 mm. In another embodiment, the molded-in lip feature 72 is laterally offset from the snap features 90 by a distance (indicated by double headed arrow 98) of from about 0.5 to about 10 mm, such as about 0.5 to about 5 mm, for example from about 0.5 to about 3 mm. By positioning the molded-in lip feature 72 relatively close to the grooved hinge 88 and the snap features 90, the molded-in lip feature 72 is firmly pressed against the outer surface 22 of the substrate 12 to effectively form the seal 74.

In an exemplary embodiment, the airbag chute-door assembly 14 is formed of a thermoplastic elastomeric/elastomer (TPE) material 99. The TPE material 99 is elastomeric and relatively compliant, and has a relatively high elongation over a wide range of temperatures (e.g., from about −30° C. to about 115° C.) and ductility at cold temperatures (e.g., about −30° C.). The TPE material 99 can be a thermoplastic material that comprises a styrenic component, an olefinic component, a urethane component, a copolyester component, or combinations thereof. Alternatively, the TPE material 99 can be a thermoplastic vulcanizate (TPV). In an exemplary embodiment, the TPE material 99 has a relatively high elongation at 23° C. of about 25% or greater, such as from about 25% to about 500%, for example from about 50% to about 300%. In an exemplary embodiment, the TPE material 99 has a relatively low flexural modulus at 23° C. of about 1,000 MPa or less, such as about 500 MPa or less, for example from about 1 MPa to about 100 MPa. The TPE material 99 helps the airbag chute-door assembly 14 to absorb energy and control movement of the integrated airbag door 52 during airbag deployment and further, helps the molded-in lip feature 72 be relatively compliant or flexible to pressingly interface with the outer surface 22 of the substrate 12 to effectively form the seal 74. Non-limiting examples of suitable TPE materials include various grades of HIPEX® and Thermolast® TPEs manufactured by Kraiburg TPE Corporation, located in Duluth, Ga. and various grades of TPE manufactured) by Mitsubishi Chemical Performance Polymers, Inc. including TT860 N3. Many other suitable TPE materials are also commercially available from other suppliers.

Figure 5:
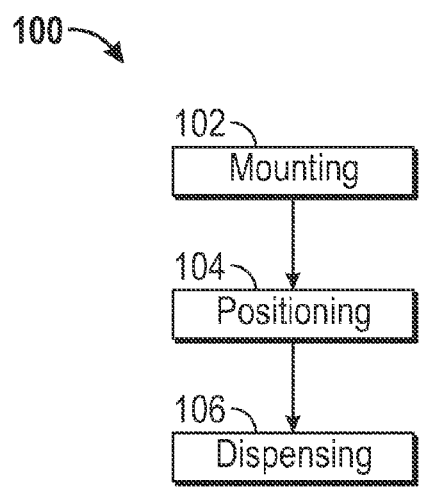
FIG. 5 is a flowchart of a method of making a FIP interior panel having an integrated airbag door for a motor vehicle in accordance with an exemplary embodiment.

Referring to FIG. 5, a flowchart of a method of making interior panel having an integrated airbag door for a motor vehicle in accordance with an exemplary embodiment is provided. The method 100 comprises mounting (step 102) an airbag chute-door assembly to a substrate such that the airbag chute-door assembly at least partially covers an opening in the substrate. A molded-in lip feature extends from a flange section of a perimeter flange of the airbag chute-door assembly to contact an outer surface of the substrate, forming a seal between the airbag chute-door assembly and the substrate. A skin covering is positioned (step 104) extending over the outer surface of the substrate. A foam forming material is dispensed (step 106) between the skin covering and the substrate and the foam forming material is allowed to form a foam.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel having an integrated airbag door for a motor vehicle, the interior panel comprising:
    a substrate having an outer surface, an inner surface, and an opening extending therethrough;
    an airbag chute-door assembly mounted to the substrate, the airbag chute-door assembly comprising:
        a chute wall at least partially surrounding an interior space and configured to direct passage of an airbag through the interior space towards the opening during deployment;
        a door flap portion pivotally connected to the chute wall and at least partially covering the opening; and
        a perimeter flange extending from the chute wall away from the interior space, the perimeter flange having a flange section overlying the outer surface of the substrate and a molded-in lip feature that extends from the flange section and contacts the outer surface to form a seal between the flange section and the substrate, wherein the flange section defines a relief channel disposed adjacent to the molded-in lip feature;
    a skin covering extending over the substrate; and
    a foam disposed between the skin covering and the substrate.

2. The interior panel of claim 1, wherein the molded-in lip feature is laterally adjacent to and surrounds the opening to form the seal.

3. The interior panel of claim 1, wherein the molded-in lip feature extends from the flange section in a direction away from the opening.

4. The interior panel of claim 1, wherein the molded-in lip feature extends from the flange section at an angle of from about 1 to about 44 degrees.

5. The interior panel of claim 1, wherein the molded-in lip feature extends from the flange section at an angle of from about 1 to about 17 degrees.

6. The interior panel of claim 1, wherein the molded-in lip feature as a thickness of from about 0.5 to about 3 mm.

7. The interior panel of claim 1, wherein the molded-in lip feature extends from the flange section a distance of from about 2 to about 6 mm.

8. The interior panel of claim 1, wherein an inner perimeter edge of the substrate defines the opening and the molded-in lip feature is laterally offset from the inner perimeter edge a distance of from about 0.5 to about 5 mm.

9. The interior panel of claim 1, wherein an inner perimeter edge of the substrate defines the opening and the airbag chute-door assembly defines a plurality of snap features that are formed along the chute wall and that engage a section of the inner perimeter edge for mounting the airbag chute-door assembly to the substrate.

10. The interior panel of claim 9, wherein the molded-in lip feature is laterally offset from the snap features a distance of from about 0.5 to about 10 mm.

11. An interior panel having an integrated airbag door for a motor vehicle, the interior panel comprising:
    a substrate having an outer surface, an inner surface, and an opening extending therethrough;
    an airbag chute-door assembly mounted to the substrate, the airbag chute-door assembly comprising:
        a chute wall at least partially surrounding an interior space and configured to direct passage of an airbag through the interior space towards the opening during deployment;
        a door flap portion pivotally connected to the chute wall and at least partially covering the opening; and
        a perimeter flange extending from the chute wall away from the interior space, the perimeter flange having a flange section overlying the outer surface of the substrate and a molded-in lip feature that extends from the flange section and contacts the outer surface to form a seal between the flange section and the substrate;
    a skin covering extending over the substrate; and
    a foam disposed between the skin covering and the substrate, and wherein an inner perimeter edge of the substrate defines the opening and the airbag chute-door assembly defines a grooved hinge that is disposed along the chute wall for engaging a section of the inner perimeter edge for mounting the airbag chute-door assembly to the substrate.

12. The interior panel of claim 11, wherein the molded-in lip feature is laterally offset from the grooved hinge a distance of from about 0.5 to about 8 mm.

13. The interior panel of claim 1, wherein the airbag chute-door assembly is formed of a TPE material or other compliant polymeric material that has a relatively high elongation at 23° C. of about 25% or greater and a relatively low flexural modulus at 23° C. of about 1,000 MPa or less.

14. A method of making an interior panel having an integrated airbag door for a motor vehicle, the method comprising the steps of:
    mounting an airbag chute-door assembly to a substrate such that the airbag chute-door assembly at least partially covers an opening in the substrate and that a molded-in lip feature extends from a flange section of a perimeter flange of the airbag chute-door assembly to contact an outer surface of the substrate forming a seal between the airbag chute-door assembly and the substrate, wherein the flange section defines a relief channel disposed adjacent to the molded-in lip feature;
    positioning a skin covering extending over the outer surface of the substrate; and
    dispensing a liquid foam forming material between the skin covering and the substrate and allowing the liquid foam forming material to form a foam.

* * * * *